Figure 1:
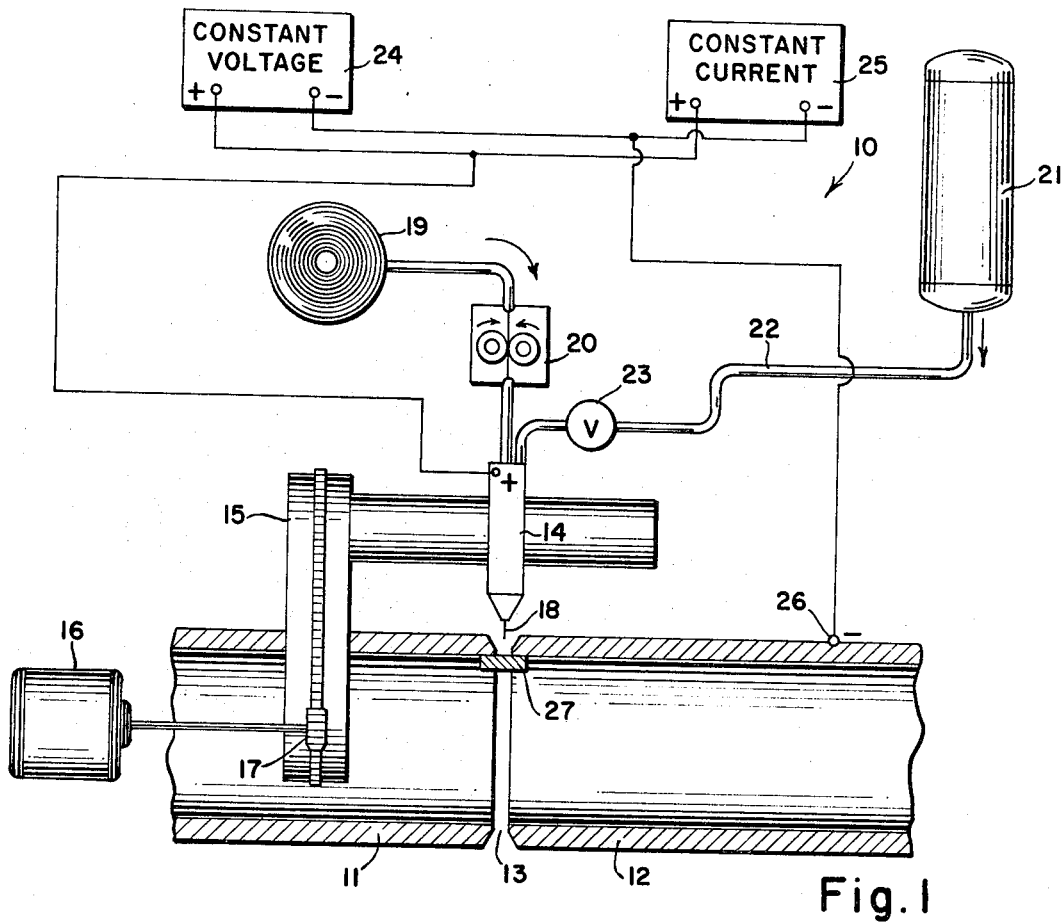

United States Patent
Ballis

[15] 3,668,360
[45] June 6, 1972

[54] AUTOMATIC PIPELINE WELDING METHOD

[72] Inventor: William L. Ballis, 661 Leap Road, Hilliard, Ohio 43026

[22] Filed: Feb. 24, 1971

[21] Appl. No.: 118,449

Related U.S. Application Data

[63] Continuation-in-part of Ser. No. 18,370, Mar. 12, 1970, abandoned, aed a continuation of Ser. No. 704,437, Feb. 9, 1968, abandoned.

[52] U.S. Cl..............................219/61, 219/131, 219/137, 219/160
[51] Int. Cl.......................................................B23k 31/06
[58] Field of Search................219/60 A, 60 R, 61, 131, 137, 219/160, 161

[56] References Cited

UNITED STATES PATENTS

| | | | |
|---|---|---|---|
| 3,180,965 | 4/1965 | Kitrell | 219/61 |
| 3,148,266 | 9/1964 | Bichsel et al. | 219/131 X |
| 2,331,689 | 10/1943 | Hodge | 219/160 |
| 3,325,626 | 6/1967 | Sargent | 219/137 |

OTHER PUBLICATIONS

Smith, A. A., "Features of Short Circuit Carbon Dioxide Arc Welding with a Duplex Power Source," Apr, 1966, British Welding Journal, Vol. 13, pp. 1048, 216–223

Primary Examiner—J. V. Truhe
Assistant Examiner—L. A. Schutzman
Attorney—Curtis, Morris & Safford

[57] ABSTRACT

The method for automatically welding pipelines by means of a gas shielded short circuiting electric arc is disclosed wherein the arc is supplied by a consumable metal electrode which is connected in parallel to both a constant voltage power source and a constant current power source. A solid non-consumable metal backup plate is positioned against the root opening of the weld joint, an arc is established between the electrode and the pipeline and the electrode is moved along the circumference of the pipeline in proximity to the weld joint. The electrode is supplied to the joint at a constant feed rate selected from the range of between 350 and 1,000 inches per minute during each of a stringer bead pass, one or more filler passes, and a cap pass of the electrode about the circumference of the pipeline. During each of the passes the current supplied to the electrode by the constant current source is selected in accordance with the feed rate in order to maintain the current supplied by the constant voltage source, and thus the arc force, below a predetermined level for each selected feed rate while maintaining a short circuiting type welding operation.

11 Claims, 2 Drawing Figures

AUTOMATIC PIPELINE WELDING METHOD

This application is a continuation-in-part of my copending U.S. Pat. application, Ser. No. 18,370 filed Mar. 12, 1970, now abandoned, which is a continuation of U.S. Pat. application Ser. No. 704,437, filed Feb. 9, 1968 and now abandoned.

This invention relates to a welding method and in particular to a method for automatically welding pipeline by means of a gas-shielded short circuiting electric arc.

The automatic welding of pipelines by conventional gas-shielded metal arc processes has heretofore been frustrated by two major problems. First, the welding times possible have been too slow to be competitive with other welding techniques. Second, the preprogrammed travel speed of the automatic welding heads around the pipe could not compensate for slight variations in the weld joint (i.e. variations in spacing of the root opening and the joint angle). It has also been impossible to obtain consistently good welds without a skilled welder constantly adjusting the travel speed and oscillations of the welding head so welding speeds have been substantially limited.

One previously proposed method of obtaining faster travel speeds about a pipe is to merely increase the diameter size of the electrode fed to the weld joint. However, with a larger diameter wire, a larger arc force is created between the end of the electrode and the molten puddle. Because of this force, the wire tends to shoot inside the pipe, causing an unstable welding condition wherein inconsistent welds are formed. Moreover, the high arc force produced in this manner tends to destroy any backup plate placed over the root opening of the weld. Thus, even with larger diameter wire the welding speed rate has been limited in the past. Another limitation in systems utilizing large wire diameter electrodes is that the electrode feed rate is limited for the short circuit mode of welding. This type of welding is preferred in the welding out of position workpieces and in particular for pipeline welding wherein vertical and overhead welds must be made. As the feed rate for large diameter wire increases, the mode of welding goes from short circuiting to globular. The latter mode is not practical for out of position welding. This phenomenon places a relatively low wire feed rate and thus travel speed limit on conventional short circuit welding even when relatively large diameter electrode wire is used.

Another conventional system of short circuit arc welding utilizes only a constant voltage power source. However, these types of systems have serious limitations since as the feed rate of the electrode is increased, the current supplied by the power source, and thus the arc force, is increased, so that a point is eventually reached where the arc force becomes so great as to burn through the weld joint and, if one is used, through the metal backup plate. As a result, an upper limit is placed on the feed rate of electrode to the weld joint for making consistently good welds. This simultaneously, of course, places a limit on the travel speed of the weld head about the pipeline.

Accordingly, it is an object of the present invention to weld pipeline joints at relatively high speeds with a short circuiting welding technique.

It is another object of the present invention to weld pipeline joints in an automatic process.

Yet another object of the invention is to make consistently uniform and satisfactory welds at a pipe joint in a relatively high speed automatic process.

A further object of the invention is to weld pipeline joints in a relatively simple and rapid process wherein consistently good welds are obtained.

In accordance with an aspect of the present invention weld joints between pipes positioned end to end in the pipeline are automatically welded, typically, in three types of welding passes, each of which utilizes distinct welding techniques selected in accordance with the short circuiting welding requirements of each pass. Power is supplied to an electrode from a dual power source having a constant voltage power source connected in parallel to a constant current power source. The electrode is mounted in an apparatus that is adapted to move the electrode about the circumference of the pipe at varying speeds during each of the three types of passes. During the first pass, stringer bead, or root pass, a metal backup plate having a copper surface is positioned against the root opening of the joint along the inside diameter of the pipes. The solid metal backup plate positioned against the root opening of the weld joint, together with the constant voltage power source connected in parallel with the constant current power source cooperate to increase greatly welding speed and welding consistency, thereby making automatic welding of pipeline by a gas-shielded metal arc short circuiting process commercially feasible. This is accomplished by selectively adjusting the current furnished by the constant current power source in accordance with the feed rate of the electrode to the weld joint so that, as more fully described hereinafter, the current level supplied by the constant voltage power source is maintained below predetermined levels and thus the arc force of the welding apparatus is controlled during the various welding passes. The control of the arc force in this manner greatly increases the speed at which the welding wire or electrode may be fed to the weld joint. This is particularly beneficial, since in order to obtain faster welding travel speeds around the pipe and still deposit a sufficient volume of metal in the weld joint, it is necessary to feed more wire into the weld puddle. Thus, the increased wire feed speed achieved by the method of the present invention permits a faster travel speed about the pipe joint.

The broad characteristics of a duplex or dual power source for arc welding, similar to that used in the method of the present invention, has been described by A. A. Smith in the British Welding Journal, Volume 13, Page 1048 (1966) wherein a short circuiting welding process is described using a one thirty-second of an inch diameter electrode shielded by carbon dioxide gas with a wire feed rate of 300 to 800 inches per minute in a flat position. The position described in this article is not a weld joint but is an experimental procedure in which a bead is formed on a flat plate. The method and apparatus disclosed by Smith also mentions vertical position welds wherein a wire feed speed of up to 400 inches per minute were obtained. However, the test results noted therein showed lack of penetration in the root pass and lack of interpass fusion on the filler passes. Smith further discusses certain tests run with his apparatus on pipeline joints which were performed manually with one thirty-second of an inch diameter electrode wire and current from the constant current source supplied at 100 amperes. The wire feed rate at which the pipeline joint welds were made is not disclosed and the results from the report are incomplete and inconclusive. Moreover, at the relatively low feed rates, power and current levels suggested by Smith, a low arc force is produced and cold lapping of the welds is produced.

The method of the present invention overcomes the limitations placed on conventional welding systems utilizing larger diameter electrode wire or constant voltage power sources for short circuit welding and produces consistently good welds at high speeds while utilizing a duplex power system operating in the short circuiting mode. This is achieved by advantageously utilizing a characteristic of the duplex power system during each of the welding passes along the weld joint. This characteristic is that the arc force at the weld, as in conventional systems, is proportioned to the amount of current supplied by the constant voltage power source. As the current level supplied from the constant current power source is increased, the current supplied by the constant voltage power source decreases, thereby decreasing the arc force. Thus, the arc force level is controlled by the constant current level. With the decreased arc force, electrode wire may be fed to the weld joint at increased rates without danger of burnthrough while the current from the constant current power source compensates for the lost current from the constant voltage power source and supplies the energy required to melt the electrode and obtain consistently good welds in the short circuiting mode of welding at substantially higher feed rates.

During the stringer or root pass of a pipeline welding operation it is desirable to utilize a backup plate to contain the molten weld metal and hold the same about the root opening of the joint. In the method of the present invention a copper backup plate is utilized during the root pass in order to contain the liquid metal in the joint between the welding arc and the backup. However, if the arc force is too high or erratic, the liquid metal will be pushed aside (burnthrough) and the backup metal will be exposed to high arc temperatures of approximately 6,000° F and destroyed. On the other hand, if the arc force is too low, the liquid metal will sag, that is, fall away, when welding the pipeline in the overhead position.

It has been found that in order to avoid burnthrough in making the root pass of a stationary pipeline, the arc force at the weld joint must be less than the arc force produced by a constant voltage power source alone when supplying current at 160 amperes. Thus, in accordance with the present invention, as the wire feed speed rate is increased above conventional rates, current is added from the constant current source so that the current supplied by the constant voltage power source is below 160 amperes when the latter source is supplying power at approximately 24 volts. The additional current required for the increased feed rates is supplied from the constant current power source so that sufficient energy is present in the welding head to melt the electrode in accordance with the short circuiting mode of welding, and yet the arc force is maintained at a level wherein burnthrough is avoided.

The wire feed rate of the method of the present invention is selected during the root pass from the range of 500 to 900 inches per minute. These rates are substantially higher than those of conventional welding equipment and yet consistent high speed welds are achieved without burnthrough because of control of the arc force at the above-mentioned current and voltage levels in accordance with the selected wire feed speed. In addition, during the root pass, the distance between the electrode electrical contact tip and the backup plate, that is, the distance conventionally called the "stick out" distance, is preferably maintained at approximately twice the conventional short-circuiting or "stick out" distance of three-eighths of an inch and in particular is held within the range of five-eighths to three-fourths of an inch. This increase in "stick out" distance also reduces the current drawn from the constant voltage power source and thereby reduces the arc force at the weld, and as a result, flattens the weld surface to provide a smooth and consistent appearance.

The metal backup plate is important at the increased welding speeds of the present invention since the backup plate permits the toleration of wider variations in the root opening as it holds the weld puddle against the root opening during solidification thereof and simultaneously promotes good quality welds. By controlling the arc force as described above, there is no burnthrough in the root pass since the backup plate supports the molten weld metal at all times. Further, the presence of the backup plate eliminates any weld bead concavity since the weld's metal solidifies directly against the plate and promotes a solidification pattern in three directions as compared to welds made without a backup which show a dendritic solidification in two directions. With the backup plate it is possible to obtain consistently high quality welds while traversing the entire weld joint at a constant travel speed. This last feature eliminates the necessity for programming a variable travel speed for the welding head and also eliminates the need to have an operator constantly present during the welding operation to manually operate the welding head. By operating the welding apparatus in accordance with the method of the present invention, the travel speed of the welding head about the pipeline is raised to between 28 and 30 inches per minute as compared to previously proposed manual and semiautomatic systems whose travel speeds are limited to approximately 12 inches per minute.

The second pass of the welding method of the present invention is the filler pass during which a puddle of welding metal is laid on top of the root pass to substantially fill the joint between the ends of the pipeline. It is noted that one or more filler welds are made in welding pipeline, and will be made with this invention, depending on the wall thickness of the pipe being welded. That is, the thicker the pipe walls, the more filler will be required to fill the weld joint. During the filler passes, the current and arc force must be increased in order to melt the weld metal of the root pass (interpass fusion) or prior filler passes as well as to penetrate the joint side walls to form an integral bond between the side walls and prior passes. Since the root pass is already in place and hardened, the weld joint can withstand higher arc forces than during the root pass and thus, still higher wire feed rates can be used during this pass.

It has been found that during the filler pass of the method of the present invention, the typical joint can withstand arc forces associated with constant voltage power source currents of up to 200 amperes when the latter source is supplying power of approximately 24 or 25 volts. Thus, the amount of current supplied by the constant current welding source is increased to a level such that the amount of current supplied by the constant power voltage power source is not greater than 200 amperes. Because of the higher arc force and energy in the arc, higher electrode feed rates may be selected within the range of between 600 to 1,000 inches per minute. If the arc force during this pass were too low for the feed rates used in the method of this invention with a constant power source voltage of approximately 24 or 25 volts, the weld metal would sag in the overhead position. The increased arc force operates to support the molten metal in this position and the specific constant current levels selected for the feed rates used during this pass are chosen to produce a sufficient arc force to support the weld metal while maintaining the current level supplied by the constant voltage source to no more than 200 amperes.

As a result of the increased feed rates, the weld head may travel about the pipe at approximately 34 inches per minute or more during the filler passes.

To further insure consistent and satisfactory welds the welding head may be oscillated during the filler pass. Preferably, this is done at the rate of about four oscillations per second.

The third pass of the welding method of the present invention is the last or cap pass on the pipeline. This pass covers the filler portion of the weld and laps the outer surface of the ends of the pipeline. When the cap pass is made, the welding groove is almost filled, and therefore the molten weld puddle solidifies from approximately only one plane. Consequently, the weld puddle will be fluid for a longer time period than the preceeding passes so that the likelihood of the liquid metal being pulled from the pipe joint by gravity is increased. Therefore, in order to make satisfactory welds in the overhead position, the wire feed and travel speeds must be slower than the filler passes. The arc forces also must be lower than those used in the filler pass since such high arc forces also would cause the weld metal to sag in the overhead position. Further, the welding arc is also oscillated during this pass since the area to be welded is larger than during the prior passes.

It has been found that satisfactory cap passes can be obtained while maintaining relatively high wire feed rates be selecting the amount of current supplied by the constant current welding power source, in accordance with the desired electrode feed rate, at a level such that the current supplied by the constant voltage power source is no greater than 170 amperes when the latter source is supplying power at approximately 19 to 20 volts. At this level wire feed rates from between 350 and 600 inches per minute may be selected and the weld head travel speed will be 10 to 15 inches per minute. Because of the lower travel speed, the head will be oscillated at between one and two cycles per second.

In all three types of welding passes described above, the welding force and arc stability are further controlled by employing an argon and carbon dioxide gas shield, preferably in a mixture of 75 percent argon and 25 percent carbon dioxide. The carbon dioxide in the gas shield increases penetration of the weld joint with the pipe and other weld passes. This action is controlled and limited by the argon and the latter is particularly important in the root pass since it helps prevent burnthrough or penetration of the weld metal to the backup plate.

Previously, when welding with a one thirty-second inch diameter wire the maximum wire feed rate for stable short circuiting operation with conventional welding equipment had been 300 inches per minute. With the welding method and apparatus of the present invention, the stabilized working range for a short circuiting gas-shielded metal arc welding is greatly expanded and stable arcs with wire feeds up to 1,000 inches per minute have been obtained. Using this process, it is possible to complete an initial welding pass (root bead) about a pipe in one-half of the time required by conventional manual arc welding. Further, fewer passes are required when welding according to the present invention and the increased speed and efficiency is also accompanied by improved weld quality.

Figure 2:
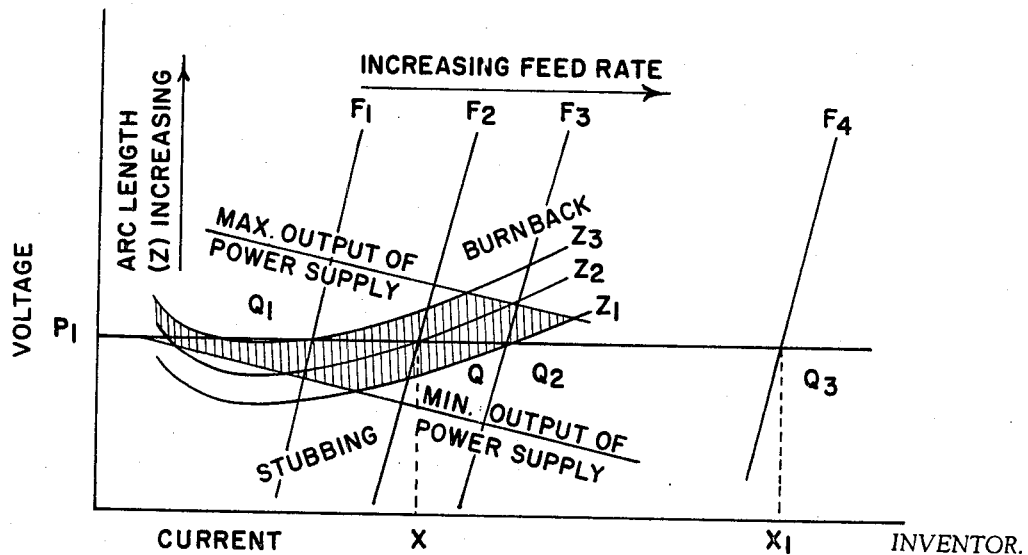

The above, and other objects, features and advantages of this invention, will be apparent in the following detailed description of an illustrative embodiment thereof which is to be read in connection with the accompanying drawings, wherein:

FIG. 1 is a schematic representation of a specific embodiment of an apparatus constructed to perform the method of the present invention; and FIG. 2 is a graph showing various parameters of a constant voltage power supply system for short-circuiting arc welding, and is utilized to describe the ineraction of the constant current power supply and the constant voltage power supply systems used in the present method.

Referring to the drawings in detail, and initially to FIG. 1 thereof, it will be seen that a welding apparatus 10 is shown which is adapted to perform the method of the present invention to weld two pipeline sections 11 and 12 meeting at a joint 13.

Apparatus 10 includes a welding torch 14 mounted upon a welding frame 15 which frame is movable along the length of the pipeline and capable of being clamped in position at a desired point thereon. When frame 15 is clamped in position on the pipeline, welding torch or head 14 (also referred to hereinafter as the electrode contact tip) is movable around at least a portion of the circumference of the pipeline by means of an electric motor 16 and a ring gear drive means shown schematically at 17.

Although the mechanical details of the apparatus are shown only schematically in the drawing, the welding frame in one embodiment of the invention rides upon four wheels while moving along the length of the pipeline. The wheels are pushed downwardly by air cylinders to lift the welding apparatus off the pipe for transit from weld joint to weld joint. At the new weld joint location, the wheels are retracted to lower the apparatus in welding position over the joint and two clamps are energized by air cylinders to fix the welding frame in position relative to the pipeline.

Welding torch 14 is supplied with a consumable metal electrode 18 delivered from a wire reel 19 by means of a wire feed mechanism 20. The electrode is typically a one thirty-second inch diameter steel wire. Torch 14 is also connected to a tank of shielding gas 21 through a gas line 22 and a valve 23. As mentioned above, the shielding gas preferably comprises a mixture of carbon dioxide and argon gases. The torch is enclosed by the gases to insure complete shielding gas coverage of the electrode and molten puddle in the joint during the welding operation.

An electrical connection is made between welding torch 14 (and the enclosed wire electrode 18) and the positive terminals of a constant voltage power source 24 and a constant current power source 25 connected in parallel. The negative terminals of both the power supplies are connected back to the pipeline as at 26. Two examples of welding power supplies having essentially constant potential characteristics and suitable for this application are the Miller type DD–400–CPS welding machine and the Aircomatic type DVR224B supply. Examples of suitable power sources having substantially constant current characteristics are the Vickors type 51E33–2 supply and the Lincoln type SA–200 welding machine.

A solid copper backup plate 27 is positioned against the root opening of the weld joint along the length of the joint which is to be welded.

In the operation of the welding apparatus, the welding frame and torch are positioned over the weld joint and clamped in position. The welding torch, together with the wire electrode feed system, is moved along the circumference of the pipeline by means of the electric motor and ring gear assembly. Although only one welding apparatus is depicted in the drawing, two duplicate systems are usually provided to weld a pipe joint—one welding torch and wire feed system traveling around half of the pipe joint, and the duplicate torch and wire feeding system moving along the remaining half of the welding joint. Shielding gas is supplied to the torch and the dual power sources 24 and 25 are energized to establish a welding arc between the wire electrode 18 and the pipeline at the weld joint.

The welding torches are moved about the pipe joint in three types of passes, i.e. the stringer bead or root pass, the filler pass, and the cap pass, in order to form a complete weld joint. The connection of welding torch 14 in parallel to the constant voltage and constant current power sources 24 and 25 permits as mentioned above, control of the arc forces applied to the joint during each of the welding passes while adequate energy is supplied to the electrode to permit greatly increased electrode feed rates and thus increased travel speeds of head 14 about the pipe joint for a short circuiting type welding operation.

Referring to FIG. 2 of the drawing, there is illustrated a voltage-current graph for a constant voltage power source on which a number of welding parameters have been superimposed. The graph is utilized herein to facilitate explanation of how the arc forces are controlled and how high electrode feed rates are obtained by the short-circuiting method of the present invention.

The ordinate of the graph represents the voltage supply level of the constant voltage power supply source 24 and the abscissa represents the current level supplied by the source. Each of the slanted lines $F_1$–$F_3$ on the graph represent selected feed rates of electrode 18 to the welding head 14. The curved lines $Z_1$–$Z_3$ represent various arc lengths between the electrode and the weld joint. The minimum and maximum power output of the power supply system are represented by two lines in the drawings which are legended accordingly.

For a fixed power supply setting $P_1$ on a constant voltage power source and a selected feed rate $F_2$ stable welding operations will occur only at one point. This point is legended Q on the graph and occurs at the intersection of the lines $F_2$, $P_1$ with the arc length curve $Z_2$. The latter is the arc length produced by the selection of voltage level $P_1$ and feed rate $F_2$. It is only at this point Q with the selected parameters $P_1$ and $F_2$ that the electrode is melted off as rapidly as it is fed into the arc. Similarly, with selected feed rates $F_1$ or $F_3$ and a voltage level of $P_1$, stable operating conditions only occur at points $Q_1$ and $Q_2$ respectively. It is noted that the lines $F_1$, $F_2$ and $F_3$ can be melt rate lines as well as feed rate lines since for stable operation the feed rate must be the same as the melt rate.

When the electrode feed rate is changed from $F_2$ to $F_3$ in a welding power supply wherein current is supplied only from a constant voltage power source, line $P_1$ and feed rate line $F_3$ cross at point $Q_2$. This becomes the new operating point with an increased current level and an arc length $Z_1$ that is shorter than $Z_2$. The arc length adjustment takes place automatically as does the adjustment of the current level supplied by the power source.

A drop in feed rate to $F_1$, moves the operating point to $Q_1$. This happens because, as with $Q_2$, this is the only point that the power line $P_1$, and the feed rate line $F_1$ cross. At point $Q_2$ the resulting arc length is $Z_3$. It is thus seen that an increase in feed rate causes a rise in current and a shorter arc while a drop in feed rate causes a drop in current and a longer arc.

With a fixed guide tube (electrical contact tip) to work distance, there are two limitations to the length of the permissible arc. The first is that the arc cannot be shorter than zero inches. Zero length is commonly known as the stubbing limit. As the arc gets shorter, the electrode finally shorts out (stubs) to the work piece. The second is known as the burnback limit. This is reached when the arc length increases to equal the guide tube to work distance. At this point the arc can transfer to the guide tube itself and cause damage or the electrode can melt off (or burnback) inside the guide tube and jam the feed mechanism. These limits are shown in FIG. 2 and are represented by the lengths $Z_1$ and $Z_3$. All the operating points for stable welding must fall between these two limits. Therefore, at least the following two requirements must be met before establishing an operating point: a) the point of operation must be within the voltage range of the power supply, and b) the point of operation must fall within the region defined by the stubbing and burnback limits. Thus, when the intersection of the three lines representing the feed length, the arc length (within the upper and lower arc length limits $Z_1$ and $Z_3$) and the power supply intersect within the shaded area of the graph a stable short-circuiting condition will be met with a constant voltage power supply. However, when the feed rate is varied so that the intersection of the feed length and power supply lines moves outside of the shaded area, unsatisfactory welding conditions are achieved. Thus, a well-defined and limited range of operating points are available in a short circuiting welding system utilizing only a constant voltage power supply system. These operating points are within a limited range of wire feed rates and thus severely restrict the weld head travel speed. For example, in the British Welding Journal, Volume 10, Page 585 (1963) Mr. A. A. Smith has reported that a feed rate of 300 inches per minute is the maximum attainable for a short circuiting mode of transfer for an electrode of one thirty-second inch diameter with a constant voltage power source supplying current at 150 amperes and a voltage of 21 volts.

The relationships shown in FIG. 2 allow the operator to select any operating point within the shaded area. By changing the feed rate, the operating point is moved to the left or right and with the right combination any location can be picked as the operating point, provided it is in a welding region.

Another limitation also effects the available operating range of conventional systems. As discussed above, the arc force produced by a constant voltage power source increases in accordance with the increase in current supplied thereby. Thus, as the feed rate and current increases, as illustrated in FIG. 2, the arc force also increases. The arc force at the weld is balanced by the surface tension of the molten liquid in the weld joint and when the arc force overcomes the surface tension, burnthrough will occur and, if a backup plate is used, the plate will be destroyed. This therefore places an upper limit on the electrode feed rate of conventional welding methods utilizing a constant voltage power source.

This upper limit on the electrode feed rate caused by the arc force factor is eliminated in the method of the present invention and greatly increased feed rates now may be utilized for short circuiting welding which will have stable operating points occurring within the shaded area of the graph in FIG. 2.

In the method of the present invention the arc force produced by the constant voltage power supply system 24 is controlled by connecting the constant current power supply source 25 in parallel with it. As current is supplied by the constant current power source, the current level supplied by the constant voltage power source will decrease. As a result, the arc force is decreased while the energy supplied to melt the electrode is maintained.

To illustrate this effect, assume that with a constant voltage power supply only a stable operating condition occurs with a feed rate of $F_2$ having a stable operating point Q at a current level of X and that the feed rate is increased to $F_4$ having a theoretical operating point $Q_3$ at a current level $X_1$ but at which stubbing occurs; by adding current from the constant current power source in parallel to the constant voltage power supply source in a sufficient amount to decrease the current level of the constant voltage power source to X, the operating point $Q_3$ is moved back to Q within the shaded area of the graph. However, the feed rate remains the same since the energy supplied to the electrode is substantially the same or slightly increased due to the increased current from the constant current supply source and thus a stable welding condition is obtained at the desired higher feed rate.

For each of the welding passes of the present invention, a different operating point along the line $P_1$ must be selected for varying reasons. Preferably, the voltage supplied by constant voltage power supply 24 is selected from the range of between 19 and 25 volts, depending on the requirement of each particular pass and the current level supplied during each of the passes is selected in accordance with the selected feed rate to maintain the current level supplied by the source 24 below that at which burnthrough or other undesirable effects will occur during shortcircuiting welding. The specific feed rates and current levels utilized in each pass are fully described above.

It is believed that the welding method of the present invention provides greater weld deposition rates in the short circuiting mode of transfer than previously proposed gas-shielded metal arc welding practices. In particular, as a result of the high feed rates available by the method of the present invention, it has been found that the speed of moving of the electrode along the circumference of the pipeline may be at the relatively substantial rate of 10 to 35 inches per minute. Moreover, the method and apparatus described above are not as sensitive to pipe joint variations as other pipe welding processes and they are usable in all welding positions without changing welding variables such as travel speed, arc voltage and wire feed rates.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. The method of automatically welding a circumferential weld joint between the edges of a pair of pipes positioned end to end in the pipeline by means of an electric arc supplied by a consumable metal electrode comprising the steps of, positioning a solid metal backup plate across the root opening of said weld joint, electrically connecting said metal electrode in parallel to a constant voltage power source and a constant current power source, selecting the voltage output of said constant voltage power source at a level within the range of 19 to 25 volts; initially supplying said electrode to said joint at a constant feed rate selected from the range of 500 to 900 inches per minute, establishing a short circuiting electric arc between said electrode and said pipeline, moving said consumable electrode in a stringer pass along the circumference of said pipeline in proximity to said weld joint, selecting the current level supplied to said electrode by said constant current source during said stringer pass in accordance with the selected electrode feed rate to maintain the current level supplied by said constant voltage source to at most 160 amperes; upon completion of said stringer pass, supplying said electrode to said joint a constant feed rate selected from the range of 600 to 1,000 inches per minute, moving said consumable electrode in a filler pass along the circumference of said pipeline in proximity to said weld joint, selecting the current level supplied to said electrode by said constant current source during said filler pass in accordance with the selected electrode feed rate to maintain the current level supplied by said constant voltage source to at most 200 amperes; maintaining the distance between the electrical contact tip of said electrode and said backup at a distance within the range of five-eighths to three-fourths of an inch during said stringer and filler passes, and moving said electrode along the circumference of said pipeline during said passes at a rate of between 10 and 35 inches per minute.

2. The method of claim 1 wherein said step of positioning a solid metal backup plate across said root opening includes the step of engaging said plate with at least one of said pipes adjacent the edge thereof.

3. The method of claim 2 including the step of oscillating said electrode across said joint during said filler pass at the rate of between one and four cycles per second.

4. The method of claim 1 including the step of shielding the welding arc with a gas mixture of argon and carbon dioxide.

5. The method of automatically welding the stringer bead pass of a circumferential weld joint between the edges of a pair positioned end to end in a pipeline by means of an electric arc supplied by a consumable metal electrode comprising the steps of, electrically connecting said metal electrode in parallel to a constant voltage power source and a constant current power source, positioning a solid metal backup plate across the root opening of said weld joint, supplying said electrode to said joint at a constant feed rate selected from the range of 500 to 900 inches per minute, selecting the current level supplied to said electrode by said constant current source in accordance with the selected electrode feed rate to maintain the current level supplied by said constant voltage source to at most 160 amperes, selecting the distance between the electrical contact tip of said electrode and said backup at a distance within the range of five-eighths to three-fourths of an inch, establishing a short circuiting electric arc between said electrode and said pipeline, moving said electrode along the circumference of said pipeline in proximity to said weld joint at a rate of between 10 and 35 inches per minute, and shielding the welding arc with a gas mixture of argon and carbon dioxide.

6. The method of claim 5 wherein said step of positioning a solid metal backup plate across said root opening includes the step of engaging said plate with at least one of said pipes adjacent the edge thereof.

7. The method of claim 6 including the step of establishing the voltage supplied by said constant power source at approximately 24 volts.

8. The method of automatically welding the filler pass of a circumferential weld joint between the edges of a pair of pipes positioned end to end in a pipeline by means of an electric arc supplied by a consumable metal electrode comprising the steps of electrically connecting said metal electrode in parallel to a constant voltage power source and a constant current power source, positioning a solid metal backup plate across the root opening of said weld joint, supplying said electrode to said joint at a constant feed rate selected from within the range of 600 to 1,000 inches per minute, selecting the current level supplied to said electrode by said constant current source in accordance with the selected electrode feed rate to maintain the current level supplied by said constant voltage source to at most 200 amperes, selecting the distance between the electrical contact tip of said electrode and the backup plate at a distance within the range of five-eighths to three-fourths of an inch, establishing a short circuiting electric arc between said electrode and said pipeline, moving said electrode along the circumference of said pipeline in proximity to said weld joint at a rate of between 10 and 35 inches per minute, and shielding the welding arc with a gas mixture of argon and carbon dioxide.

9. The method of claim 8 wherein said step of oscillating said electrode across said joint at the rate of approximately four cycles per second.

10. The method of claim 9 including the step of establishing the voltage supplied by said constant power source at approximately 24 volts.

11. The method of claim 10 including the step of selecting the speed of movement of said electrode along the circumference of said pipeline at a rate of approximately 35 inches per minute.

* * * * *